(12) United States Patent
Knockeart et al.

(10) Patent No.: US 6,968,311 B2
(45) Date of Patent: Nov. 22, 2005

(54) USER INTERFACE FOR TELEMATICS SYSTEMS

(75) Inventors: Ronald P. Knockeart, Clarkston, MI (US); Melvin A. Rode, Independence Township, MI (US); Gregory Delgiudice, Almont, MI (US)

(73) Assignee: Siemens VDO Automotive Corporation, Auburn Hills ( * ) Notice: Subject to any disclaimer, the term of this patent is extended or adjusted under 35 U.S.C. 154(b) by 586 days.

(21) Appl. No.: 09/918,360

(22) Filed: Jul. 30, 2001

(65) Prior Publication Data

US 2002/0069071 A1   Jun. 6, 2002

Related U.S. Application Data

(60) Provisional application No. 60/221,431, filed on Jul. 28, 2000.

(51) Int. Cl.⁷ .......................... G10L 15/22; H05K 11/02
(52) U.S. Cl. ...................... 704/270; 704/275; 455/345
(58) Field of Search .......................... 704/270, 270.1, 704/275; 455/345; 379/39

(56) References Cited

U.S. PATENT DOCUMENTS

| | | | |
|---|---|---|---|
| 5,177,685 A | 1/1993 | Davis et al. | |
| 5,239,700 A | 8/1993 | Guenther et al. | |
| 5,301,227 A * | 4/1994 | Kamei et al. | 379/88.03 |
| 5,651,056 A | 7/1997 | Eting et al. | |
| 5,794,205 A * | 8/1998 | Walters et al. | 704/275 |
| 5,812,977 A * | 9/1998 | Douglas | 704/275 |
| 5,850,630 A * | 12/1998 | Wilson | 704/270 |
| 6,012,030 A * | 1/2000 | French-St. George et al. | 704/275 |
| 6,018,711 A * | 1/2000 | French-St. George et al. | 704/275 |
| 6,236,768 B1 | 5/2001 | Rhodes et al. | |
| 6,243,675 B1 * | 6/2001 | Ito | 704/232 |
| 6,347,299 B1 * | 2/2002 | Holzman et al. | 704/270 |
| 6,532,446 B1 * | 3/2003 | King | 704/270.1 |
| 6,587,824 B1 * | 7/2003 | Everhart et al. | 704/275 |
| 6,615,175 B1 * | 9/2003 | Gazdzinski | 704/275 |
| 6,731,925 B2 * | 5/2004 | Naboulsi | 455/345 |
| 2001/0047263 A1 * | 11/2001 | Smith et al. | 704/275 |

FOREIGN PATENT DOCUMENTS

| | | |
|---|---|---|
| EP | 1054390 A2 | 11/2000 |
| EP | 1054390 A3 | 11/2001 |
| EP | 1189032 A2 | 3/2002 |

\* cited by examiner

*Primary Examiner*—Martin Lerner

(57) ABSTRACT

A combination of manual and voice input for a telematics system reduces visual distraction, works reliably, and is low cost. The telematics system uses a menu-based interface to communicate with the driver. This menu-based interface is accessible to the driver using both manual interactions and by voice. A reliable manual input mechanism is available using turn or push buttons in addition to voice recognition, which may not be accurate in all operating conditions. Voice recognition inputs can be limited to small numbers of words or phrases that can be more easily distinguished by a voice recognizer. Furthermore, voice outputs of the system are tailored to that they are readily recognizable to the driver. Manual input is optionally rejected in operating conditions in which such input is dangerous or prohibited.

25 Claims, 4 Drawing Sheets

USER INTERFACE FOR TELEMATICS SYSTEMS

CROSS-REFERENCE TO RELATED APPLICATIONS

This application claims the benefit of U.S. Provisional Application No. 60/221,431 filed 28, Jul. 2000, which is incorporated herein by reference.

BACKGROUND

This invention relates to a mixed manual and spoken user interface for telematics systems.

There is an increasing amount of concern about the safe operation of telematics systems such as motor vehicle based telematics. Such systems include vehicle navigation systems and cellular telephones. This concern is reflected in standard-setting activities, for example, that are addressing acceptable amounts of time required for a driver of a motor vehicle to input a request for a telematics function. Such input may be a destination for a route-planning function of a navigation system. In addition to standards-setting activities, there may be legislation or regulation concerning this issue.

It has been suggested that automatic voice recognition can be used as the input to the telematics system to relieve the visual distraction problem. While in principle voice recognition seems to be a perfect solution, there are certain serious problems. While voice recognition was already demonstrated several decades ago, it is still far from 100% reliable, particularly in noisy vehicle environments. Since telematics systems often include menu-based interfaces, a system using purely spoken input without other prompting requires the user to memorize a menu tree in order to use the system. Voice recognition systems also require relatively large amounts of memory and computational power thus making vehicle telematics more expensive.

SUMMARY

In a general aspect, the invention provides a combined manual and spoken interface for a telematics system. This interface reduces visual distraction, works reliably, and is low cost. The telematics system uses a menu-based interface to communicate with the user. This menu-based interface is accessible to the user using both manual interactions and by voice. A reliable manual input mechanism is available using buttons, such as using turn and push buttons, in addition to voice recognition, which may not be accurate in all operating conditions. Voice recognition inputs can be limited to small numbers of words or phrases that can be more easily distinguished by a voice recognizer. Furthermore, voice outputs of the system are tailored so that they are readily recognizable to the user.

In one aspect, in general, the invention is a method for controlling a device using mixed manual and spoken input. A user of the device is prompted using a combination of a visual prompt and an audible prompt. This prompting includes presenting a set of input choices, and accepting a command from the user to provide an audible prompt. In response to the command from the user, an audible prompt that identifies one or more of the set of input choices is played. Input is accepted then from the user in response to the visual and audible prompts.

The method can include one or more of the following features:

Presenting the set of input choices includes graphically presenting the set of choices.

Presenting the set of input choices includes audibly presenting the set of choices.

Accepting the command from the user to provide an audible prompt includes accepting a manual command.

Accepting the command from the user to provide an audible prompt includes accepting a spoken command.

Playing the audible prompt includes playing an audible representation of the one or more of the choices.

Playing the audible representation of the choices includes playing a spoken description of the choices.

Playing the audible representation of the choices further includes applying a speech synthesis algorithm to produce the spoken description.

Playing the audible representation of the choices further includes accessing a stored audio representation of the spoken description.

Playing the audible representation of the choices further includes receiving data characterizing the spoken description from a remote location.

Accepting the input in response to the visual and audible prompts includes accepting a manual input.

Accepting the input in response to the visual and audible prompts includes accepting a spoken input.

The method further includes monitoring a condition of an environment of the device.

Accepting the input from the user includes limiting an input mode according to the environment.

Limiting the input mode includes rejecting manual input.

Limiting the input mode includes rejecting spoken input.

The environment of the device includes a motor vehicle and monitoring the condition of the environment includes monitoring the speed of the vehicle.

Limiting the input mode includes rejecting manual input when the speed of the vehicle exceeds a threshold speed.

In another aspect, in general, the invention is a mobile device. The device has a user interface that includes a graphical display, a manual input device, an audio output device, and an audio input device. The device also includes a controller that is coupled to the user interface. The controller is configured to prompt a user of the device using the graphical display and the audio output device. This prompting includes displaying a visual prompt that identifies a set of input choices on the graphical display, accepting a command from the user to provide an audible prompt, and in response to the command, playing an audible prompt using the audio output device that identifies one or more of the set of input choices. The controller is also configured to accept an input from the user in response to the visual and audible prompts.

The invention has one or more of the following advantages.

Application of the invention can reduce or minimize a driver's need to divert his visual attention from a roadway while using an in-vehicle navigation telematics system or other system that requires user input. This can improve the safety of the vehicle operation as well as the driver's satisfaction with the telematics system.

The approach to providing a mixed manual and spoken interface can be added to existing manual menu-based systems without necessarily redesigning the manual interface.

The combination of graphical menus and voice input can reduce the complexity of an automatic voice recognizer by suggesting to the user what the valid spoken inputs to the system are.

The combination of a manual and spoken interface provides a natural manual alternative to purely spoken input when automatic voice recognition fails to provide accurate responses.

Other features and advantages of the invention are apparent from the following description, and from the claims.

DESCRIPTION

Figure 1:
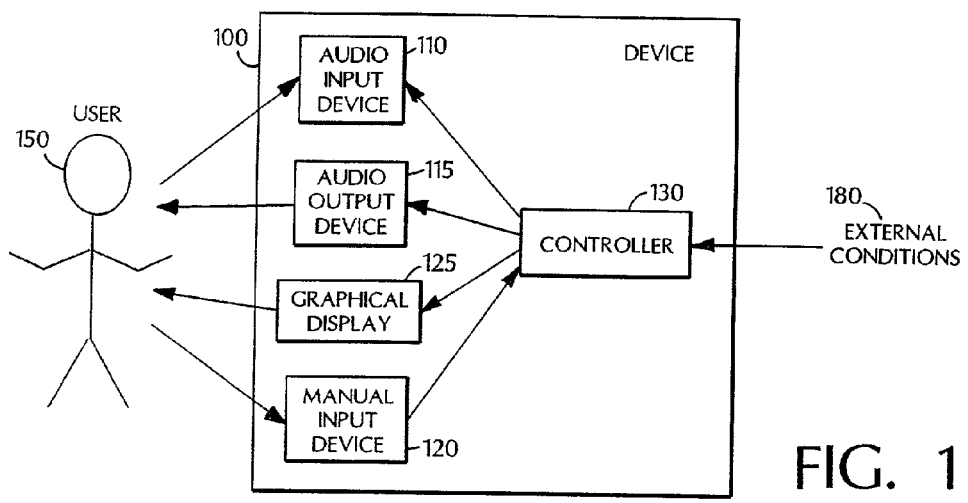
FIG. 1 is a block diagram of a device with audio and graphical user interfaces.

Referring to FIG. 1, a device 100 provides a mixed graphical/manual and oral/spoken interface to a user 150. Device 100 includes an audio input device 110 for accepting spoken commands from the user. Audio input device 110 includes a microphone and associated circuitry for processing the audio signal. In some embodiments, audio input device 110 further includes an automatic voice recognizer for interpreting the user's spoken input. Device 100 also includes an audio output device 115. Audio output device 115 includes a speaker (or other acoustic transducer) for playing an audio signal and associated circuitry for processing the audio signal. In some embodiments, audio output device 115 includes storage for audio prompts, or a speech synthesizer for automatically synthesizing audio signals. Device 100 also includes a graphical display 125 and a manual input device 120. Manual input device 120 includes one or more buttons or knobs that can be manipulated by user 150 to provide input to the device. Device 100 also includes a controller 130 that is configured to control the interaction with the user. In addition, controller 130 optionally accepts external condition signals 180 that affect the interaction with the user.

Figure 2:
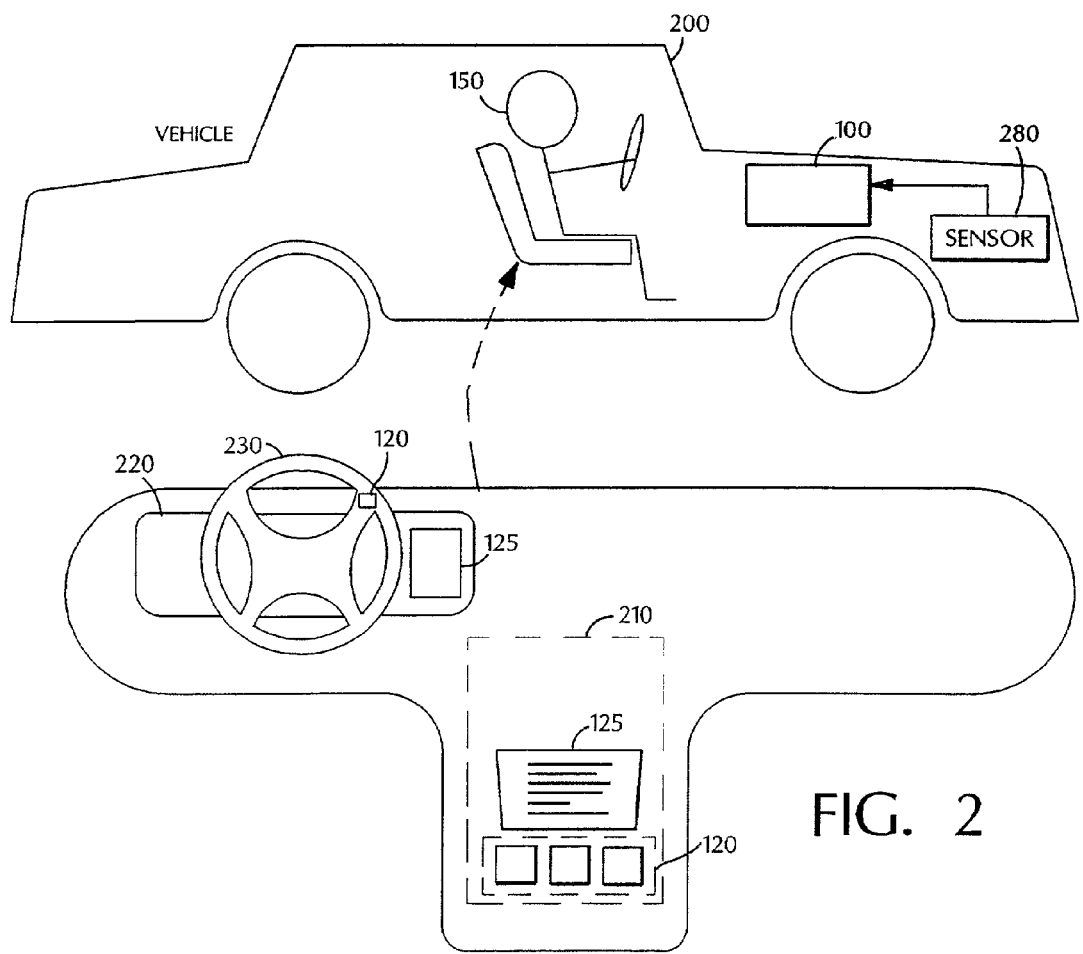
FIG. 2 is a diagram of a vehicle that includes the device.

Referring to FIG. 2, one application of device 100 is integrated in a motor vehicle 200. User 150 is typically the driver of the vehicle, although users of the device can also be passengers. Examples of deployment of device 100 in a vehicle are illustrated in FIG. 2 and can include the following features. Graphical display 125 can be located in a center console section 210 of the vehicle, or in an instrument panel 220 or overhead console, or a heads-up-display (HUD), or other location that is convenient and accessible to the driver. Manual input device 120 can also be located in the center console section, or on a steering wheel 230. Audio input device 110 and audio output device 115 can be in locations that provide adequate audio signal paths to the driver. Many other exemplary deployments in a vehicle are also possible.

In addition to providing an input/output interface to user 150, device 100 receives external condition signals 180 from sensors 280. In this embodiment, sensors 280 include a speed sensor that provides vehicle speed information to device 100. As is described below, device 100 is configured to provide different modes of user interface depending on the speed information provided by sensors 280.

As integrated in motor vehicle 200, device 100 can provide an interface to a variety of systems. Examples of such systems include telematics systems such as navigation systems, and telephone systems. In these examples, user 150 interacts with device 100 to provide inputs to the system, for example, providing inputs to select a destination for a navigation system, or providing inputs to select a telephone number to be dialed by a telephone system. In various embodiments, device 100 can be applied to a wide range of systems in which user 150 needs to provide inputs or feedback to the systems.

Figure 3:
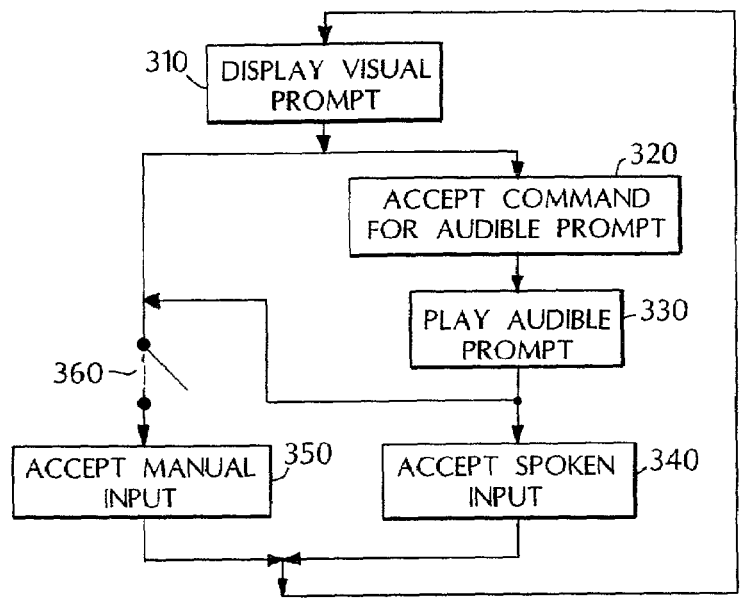
FIG. 3 is a flowchart that illustrates operation of the user interface of the device.

Referring to FIG. 3, in each of a number of interactions with user 150, device 100 displays a visual prompt to the user (step 310). For example, the device displays a menu of choices that the user can select from. In typical operating modes, device 100 can accept manual input from the user in response to the displayed prompt (step 350). Rather than providing a manual input directly, user 150 can provide a command for an audible prompt (step 320). For instance, the device 100 can be configured to accept a manual command such as by the user pressing a particular button of manual input device 120, or can be configured to accept a spoken command through audio input device 110 such as by speaking a predefined word or phrase that commands the device to provide an audible prompt. In some embodiments, the command to provide the audible prompt is implicit, for example, being combined with a prior input from the user. After accepting the command for an audible prompt, device 100 plays the audible prompt (step 330). The audible prompt provides some or all of the information in the previously displayed visual prompt. For example, the audible prompt can include spoken versions of all the choices in a displayed menu, a particular choice such as a currently selected choice in the menu, or a small subset of the choices of the displayed menu. After both the visual or audible prompts are displayed, the system either accepts manual input as before (step 350) or accepts spoken input from the user (step 340). After accepting input from the user, the process is repeated. Note that these steps may be repeated a number of times for a complete selection by the user. For instance, selection of an item from a list may involve a number of separate audible prompts and manual inputs as the user "scrolls" through the list of choices. Playing back the audible prompt provides verification to the driver that his selection was accurately recognized without taking his eyes off the road or hands off the wheel.

Device 100 accepts external condition signals 180. Depending on those signals, in some modes of operation device 100 rejects manual inputs. A "switch" 360 in the flowchart in FIG. 3 indicates this selection of modes in which manual input is rejected. For example, in some configurations in which device 100 is integrated in a vehicle (see FIG. 2), manual inputs are rejected when the vehicle speed is too fast for the user to safely use manual inputs and manual input could result in a user being distracted for too long a time at that speed. Note that whether or not manual inputs are accepted may depend on the nature of those inputs. For example, while it may be safe to provide a simple manual input for which the user does not have to take his eyes off the road such a manual input may not be rejected, but a manual input that requires the driver to select from a list or type an input on a numeric or alphabetic keyboard may be rejected since this would require the driver to potentially unsafely take his eyes off the road.

Figure 4:
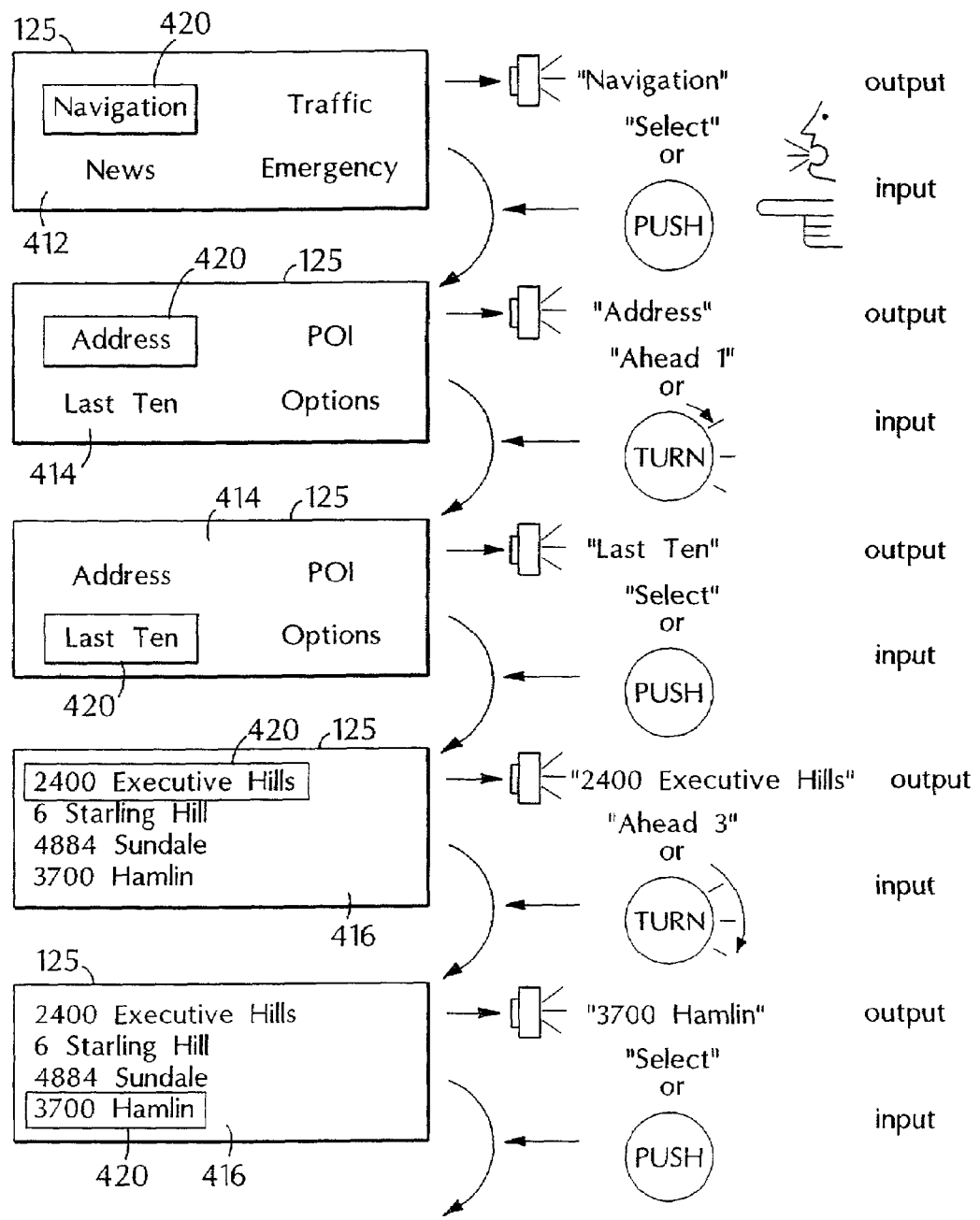
FIG. 4 is an illustration of a user interaction in which the user selects from a menu of choices.

Referring to FIG. 4, a first example of an interaction between device 100 and user 150 is in the context of a navigation system. In particular, device 100 provides an interface to a version of the Siemens Quick-Scout navigation system. One function provided to user 150 is routing to a destination in the "Last Ten" list of destinations. A sequence of presentations, or "screens," of information on display 125 is shown in the FIG. 4. In a first screen 412, a menu of a number of choices is visually presented to user 150. These include "navigation," "traffic," "news," and "emergency." A cursor 420 identifies a currently selected menu choice, in the first screen "navigation." Device 100 outputs a speech synthesized audio output of the word "navigation". User 150 next selects the "navigation" choice either by manually pushing a selection button of manual input device 120, or by speaking a predefined word to select the indicated choice, here the word "select." Device 100 then displays a next screen 414 with a next level of navigation menu choices. Initially, cursor 420 highlights the word "address" and device 100 outputs the audio prompt "address". User 150 views the menu and sees that his desired choice "last ten" is the next on the menu. User 150 selects "last ten" either manually, for example, by turning a knob one click ahead and pushing the knob, or by speaking "ahead one." Cursor 420 highlights "last ten" and device 100 outputs the phrase "last ten." User 150 then says "select" or pushes the select button. User 150 can optionally speak the entire phrase "ahead one select" to avoid hearding the "last ten" audio prompt if he knows for certain that "last ten" is the next choice. At this point device 100 displays a next screen 416, which shows the last destinations that had previously been entered by the user, and plays a spoken version of the first choice "2400 Executive Hills." In this sample scenario, user 150 selects the fourth choice, "3700 Hamlin," by turning the knob 3 clicks ahead or by saying "ahead three". The system responds by highlighting "3700 Hamlin" on the screen and outputting the synthesized speech for "3700 Hamlin." User 150 finally selects the desired destination, "3700 Hamlin," by pushing the select knob or by saying "select". At this point the navigation system proceeds with the functions required to plan a route to the selected destination.

Alternative versions of this type of interface can also be used. In one version of a similar interface, device 100 does not play an audio prompt until user 150 performs a manual action or speaks a command. For example, device 100 can play each choice in a menu as the user turns a knob, allowing the user to select the desired choice when he hears it. Alternatively, device 100 can play sets of entries in a menu in succession without requiring a separate action from the user to hear each. In the example in FIG. 4, on the first screen, all four choices, "navigation-traffic-news-emergency," can be played and the user selects manually based on this combined audio prompt. In one such alternative, the user can select the choice by pressing the select button when he hears the choice rather than performing a manual command that explicitly moves through the menu. In yet another alternative, device 100 does not provide an audio prompt until the user pauses manual input. For example, if the user uses a knob to "scroll" through the choices, the device does not play audio until the user pauses. In yet another alternative, the system plays each choice, but preempts (truncates) the playing of each choice as the user manually moves to a next choice.

Figure 5:
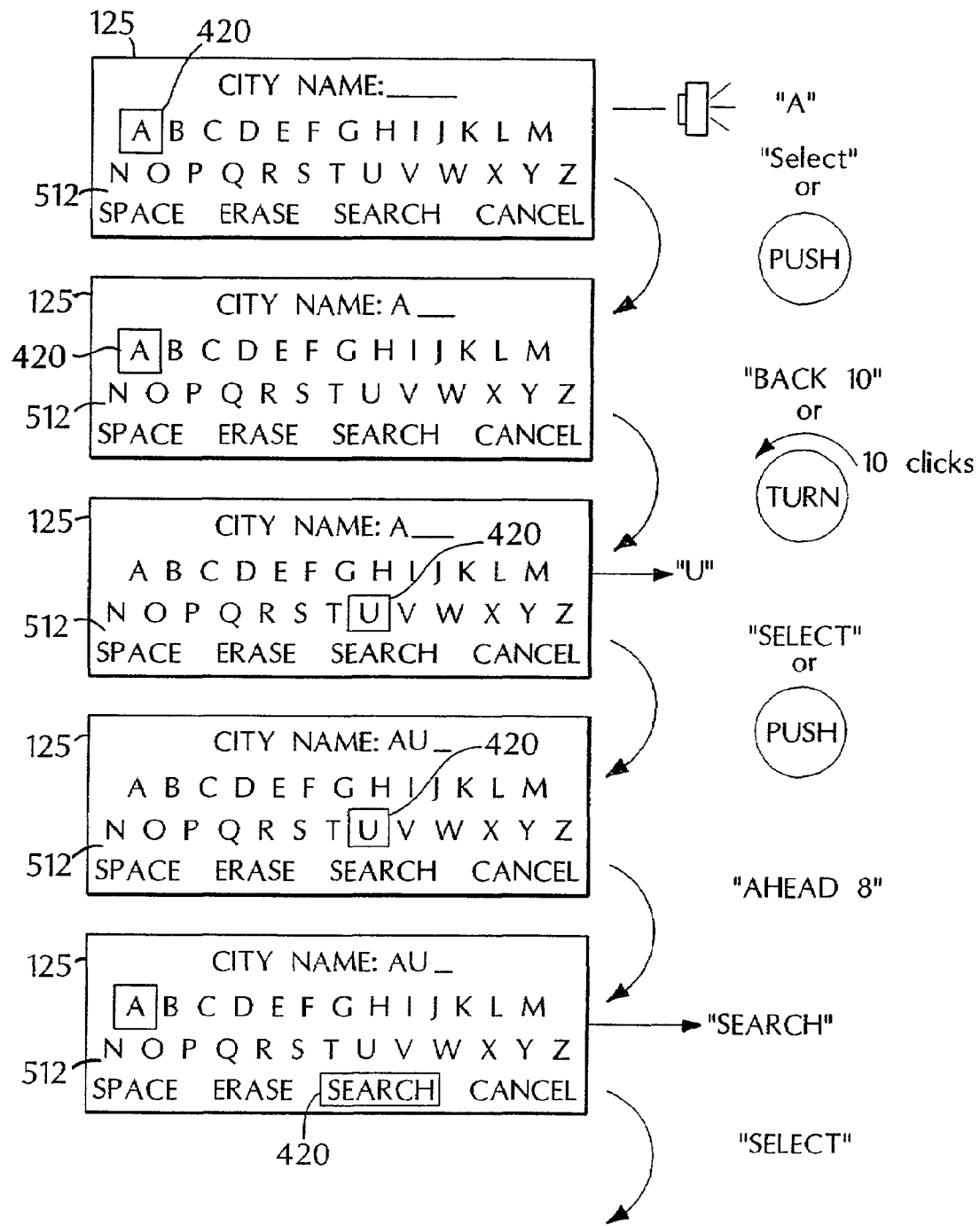
FIG. 5 is an illustration of a user interaction in which the user selects successive characters of an entry.

In a second example of an interaction between device 100 and user 150, the user can speak entries in a menu. For example, some menus include letters and number that the user uses to "type" an entry by successively choosing the appropriate letters and numbers. Referring to FIG. 5, an example of such a scenario comes in an address entry dialog in which the user is to specify a particular city name. The user is specifying "Auburn Hills." Screen 512 includes an alphabet that user 150 can use to manually spell the name by choosing the successive letters. In the figure, user 150 first chooses "A" by saying "select" or pushing the selection button. Then user 150 chooses "U" by first scrolling back through the end of the list using the "back 10" command, or turning the selector knob ten clicks to the left. Device 100 plays "U" and the user selects it by saying "select" or pressing the select button. Finally, user 150 highlights the "search" entry and selects it. At this point, device 100 displays a menu of choices of cities starting with "Au . . . " which the user selects from using a similar approach. In one alternative of this approach, the system limits the acceptable input letters based on the list of possible inputs. For example, if the only choices starting with "Au" were "Auburn Hills" and "Austin," only the letters "B" and "S" would be allowable. This reduces the complexity of the speech input task by avoiding similar sounding letters in many circumstances.

Figure 6:
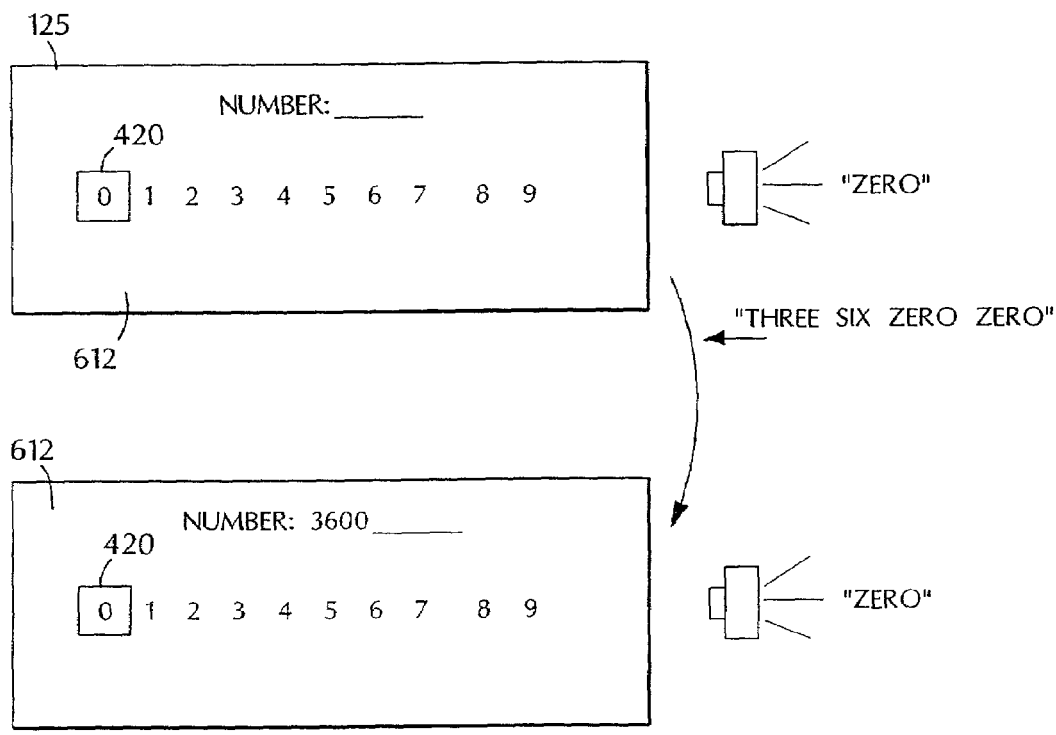
FIG. 6 is an illustration of a user interaction in which the user speaks a series of characters of an entry.

In a third example, user 150 says words associated with the entries rather than having to separately highlight and then select each part. Referring to FIG. 6, screen 612 is similar to screen 512 shown in FIG. 5 in that user 150 is to "type" by successively select entries, in this case digits. However, in this scenario, the user speaks "three-six-zero-zero" rather than highlighting and selecting each digit in turn. This type of interaction may be used in all or a limited number of menus, for example, depending of capabilities of the voice recognizer that is part of audio input device 110.

It is to be understood that the foregoing description is intended to illustrate and not to limit the scope of the invention, which is defined by the scope of the appended claims. Other embodiments are within the scope of the following claims.

What is claimed is:

1. A method for controlling a device in an environment using mixed manual and spoken input comprising:
    prompting a user of the device using a combination of a visual prompt and an audible prompt, including
        presenting a set of input choices,
        accepting a command from the user to provide an audible prompt, and
        in response to said command, playing an audible prompt that identifies one or more of the set of input choices;
    monitoring an external condition in the environment of the device; and
    accepting an input from the user in response to the visual and audible prompts, including limiting an input mode according to the external condition in the environment.

2. The method of claim 1 wherein presenting the set of input choices includes graphically presenting a list of the set of choices.

3. The method of claim 1 wherein presenting the set of input choices includes audibly presenting a list of the set of choices.

4. The method of claim 1 wherein accepting the command from the user to provide an audible prompt includes accepting a manual command.

5. The method of claim 1 wherein accepting the command from the user to provide an audible prompt includes accepting a spoken command.

6. The method of claim 1 wherein playing the audible prompt includes playing an audible representation of the one or more of the choices.

7. The method of claim 6 wherein playing the audible representation of the choices includes playing a spoken description of the choices.

8. The method of claim 7 wherein playing the audible representation of the choices further includes applying a speech synthesis algorithm to produce the spoken description.

9. The method of claim 7 wherein playing the audible representation of the choices further includes accessing a stored audio representation of the spoken description.

10. The method of claim 7 wherein playing the audible representation of the choices further includes receiving data characterizing the spoken description from a remote location.

11. The method of claim 1 wherein accepting the input in response to the visual and audible prompts includes accepting a manual input.

12. The method of claim 1 wherein accepting the input in response to the visual and audible prompts includes accepting a spoken input.

13. The method of claim 1 wherein limiting the input mode includes rejecting manual input.

14. The method of claim 13 wherein limiting the input made includes rejecting manual input when the speed of the vehicle exceeds a threshold speed.

15. The method of claim 1 wherein limiting the input mode includes rejecting spoken input.

16. The method of claim 1 wherein the environment of the device includes a motor vehicle and monitoring the condition of the environment includes monitoring the speed of the vehicle.

17. The method of claim 1 in which limiting the input mode includes rejecting a first category of manual inputs but allowing a second category of manual inputs.

18. The method of claim 17 in which the first category includes manual inputs that require the user to spend more time to complete than the manual inputs in the second category.

19. The method of claim 18 in which the first category includes a manual input that requires the user to select from a list of items.

20. A mobile device comprising:
   a user interface including, a graphical display, a manual input device, an audio output device, and an audio input device;
   a controller coupled to the user interface configured to
      prompt a user of the device using the graphical display and the audio output device, including displaying a visual prompt that identifies a set of input choices on the graphical display, accepting a command from the user to provide an audible prompt, and in response to said command, playing an audible prompt using the audio output device that identifies one or more of the set of input choices,
      monitor an external condition in an environment of the mobile device, and
      accept an input from the user in response to the visual and audible prompts, including limiting an input mode according to the external condition in the environment.

21. The mobile device of claim 20 wherein limiting the input mode includes rejecting manual input.

22. The mobile device of claim 20 wherein limiting the input mode includes rejecting spoken input.

23. The mobile device of claim 20 wherein the environment of the device includes a motor vehicle and monitoring the condition of the environment includes monitoring the speed of the vehicle.

24. The mobile device of claim 20 wherein limiting the input mode includes rejecting manual input when the speed of the vehicle exceeds a threshold speed.

25. A method for controlling a device in a motor vehicle using mixed manual and spoken input comprising:
   prompting a user of the device using a combination of a visual prompt and an audible prompt, including
      presenting a set of input choices,
      accepting a command from the user to provide an audible prompt, and
      in response to said command, playing an audible prompt that identifies one or more of the set of input choices;
   monitoring an external condition in the motor vehicle; and
   accepting an input from the user in response to the visual and audible prompts, including limiting an input mode according to the external condition.

* * * * *